(12) United States Patent
Cavaco et al.

(10) Patent No.: US 7,547,107 B2
(45) Date of Patent: Jun. 16, 2009

(54) EDGE CONSTRAINED OPTICAL MEMBRANE DEFORMABLE MIRROR AND METHOD OF FABRICATING

(75) Inventors: Jeffrey L. Cavaco, Boylston, MA (US); John A. Wellman, Chelmsford, MA (US)

(73) Assignee: Xinetics, Inc., Devens, MA (US)

( * ) Notice: Subject to any disclaimer, the term of this patent is extended or adjusted under 35 U.S.C. 154(b) by 281 days.

(21) Appl. No.: 11/412,512

(22) Filed: Apr. 27, 2006

(65) Prior Publication Data
US 2007/0253081 A1    Nov. 1, 2007

(51) Int. Cl.
*G02B 7/182* (2006.01)
(52) U.S. Cl. .................................. 359/849
(58) Field of Classification Search ............... 359/849, 359/846–848
See application file for complete search history.

(56) References Cited

U.S. PATENT DOCUMENTS

| 5,357,825 | A | * | 10/1994 | Costello et al. ............ 74/490.07 |
| 5,940,203 | A | * | 8/1999 | LaFiandra ..................... 359/290 |
| 2003/0203530 | A1 | * | 10/2003 | Lee et al. ......................... 438/72 |
| 2004/0027632 | A1 | * | 2/2004 | Watson ........................... 359/223 |
| 2005/0128558 | A1 | | 6/2005 | Ealey |
| 2006/0050421 | A1 | | 3/2006 | Ealey |

* cited by examiner

*Primary Examiner*—Joshua L Pritchett
(74) *Attorney, Agent, or Firm*—Iandiorio Teska & Coleman

(57) ABSTRACT

Fabricating a deformable mirror by providing a plurality of actuators and a support structure supporting and at least partially surrounding the actuators; applying an optical membrane across the actuators and at least a portion of the support structure; the optical membrane including a first area, a second area and an intermediate area elastically decoupling the first and second areas; bonding the first area to the actuators and the second area to the support structure; and polishing the optical membrane.

34 Claims, 13 Drawing Sheets

EDGE CONSTRAINED OPTICAL MEMBRANE DEFORMABLE MIRROR AND METHOD OF FABRICATING

FIELD OF THE INVENTION

This invention relates to an edge constrained optical membrane deformable mirror and method of fabricating it.

BACKGROUND OF THE INVENTION

Deformable mirrors employ a face sheet or optical membrane carried by a plurality of actuators that can be individually operated to provide micro and macro adjustment of the mirror surface. The optical membrane typically has a plurality of regularly spaced pads on its bonding surface which are bonded to the actuators using a bonding medium such as epoxy. After bonding the mirror surface of the membrane is lapped or polished to obtain a desired mirror finish. Lapping or polishing is typically a wet process using any of a number of different liquids which may be e.g., acid, or alkaline, etching or not-etching. During polishing shims can be used between the membrane and a holding jig to seal the actuators, pads and bonding agent from the liquid. Numerous problems occur: there can still be leakage; the edge of the membrane can be vulnerable to damage by the lap tool. In addition, the shim does not fully support the membrane against the normal force of the lap tool or the shear force of the lap tool as it moves around the mirror surface. These forces can result in a ripple effect in the mirror surface. If the shim is made more stiff or the membrane is edge constrained more rigidly the rippling is reduced but, when the clamping force is released and the membrane relaxes the mirror surface loses the surface accuracy previously achieved and more polishing is necessary. Further, even with the best sealing, some lapping liquid leaks can occur and the absorption of the liquid by the actuator material and the bonding agent causes changes in dimensions. Thus, a membrane which appears to have been polished to the desired finish may, after having dried out after a few hours or days off the grinding machine, lose that finish and have to be polished again and again until the optimum result is obtained.

The lapping action to obtain the desired finish also imposes constraints on the deformable mirror design parameters. While it is desirable to have longer, thinner actuators to produce more compact, high authority, deformable mirrors with a long stroke, the lapping normal and shear forces require a sufficient stiffness of the actuators to withstand those forces without distortion. If the actuators are not stiff enough the finish will be rippled. Typically an actuator aspect ratio of not more than usually 4:1 is used to prevent ripple which consequently constrains the available stroke. With present methods of polishing, a 30 nm surface finish on a 9 or 10 mil membrane is attainable. With such thickness the inter-actuator or relative actuator stroke is limited to approximately ½ the full dynamic range. That is, no actuator should move a stroke distance of more than ½ the full dynamic range relative to its neighboring actuators. If better methods of reacting polishing loads were available then trade offs would be possible. Either higher accuracy finish would be obtainable on the 9 or 10 mil membrane or more traditional finishes could be obtained on much thinner, e.g., 3 mil membranes. Thinner membranes are more flexible and so the limit of inter-actuator or relative stroke for neighboring actuators could be eliminated.

BRIEF SUMMARY OF THE INVENTION

It is therefore an object of this invention to provide an improved, edge constrained optical membrane deformable mirror and method of fabricating it.

It is a further object of this invention to provide such an improved, edge constrained optical membrane deformable mirror and method of fabricating it which reduces ripple due to lap normal and shear forces.

It is a further object of this invention to provide such an improved, edge constrained optical membrane deformable mirror and method of fabricating it which improves the liquid seal during lapping, grinding or polishing.

It is a further object of this invention to provide such an improved, edge constrained optical membrane deformable mirror and method of fabricating it which enables higher aspect ratio and long stroke actuators.

It is a further object of this invention to provide such an improved, edge constrained optical membrane deformable mirror and method of fabricating it which enables larger inter-actuator or relative actuator stroke.

It is a further object of this invention to provide such an improved, edge constrained optical membrane deformable mirror and method of fabricating it which enables thinner, more flexible membranes and higher accuracy finishes.

It is a further object of this invention to provide such an improved, edge constrained optical membrane deformable mirror and method of fabricating it in which the membrane is elastically connected to support structure for rigidity during lapping yet decoupled from it for less constraint in operation after polishing.

It is a further object of this invention to provide such an improved, edge constrained optical membrane deformable mirror and method of fabricating it in which the support structure, actuators and membrane form a single unit for lapping and as the deformable mirror.

The invention results from the realization that an improved deformable mirror with reduced ripple due to lap normal and shear forces, better sealing with higher actuator aspect ratio and stroke, higher inter-actuator stroke and thinner more flexible membrane and/or higher accuracy finishes can be achieved by applying an optical membrane across a plurality of actuators and at least a portion of a support structure which carries and surrounds at least partially, the actuators, the membrane including a first area bonded to the actuators, a second area bonded to the support structure and an intermediate area elastically decoupling the first and second areas of the optical membrane.

The subject invention, however, in other embodiments, need not achieve all these objectives and the claims hereof should not be limited to structures or methods capable of achieving these objectives.

This invention features an edge constrained optical membrane deformable mirror including: a plurality of actuators; a support structure supporting and at least partially surrounding the actuators and an optical membrane extending across the actuators and at least a portion of the support structure. The optical membranes having a first area bonded to the actuators, a second area bonded to the support structure and an intermediate area elastically decoupling the first and second areas of the optical membranes.

In a preferred embodiment the actuators may include ferroelectric material. The actuators may include transverse $d_{31}$ or normal $d_{33}$ actuators. The actuators may include piezoelectric, magnetostrictive or electrostrictive material. The actuators may include an aspect ratio of greater than 4:1. The actuators and support structure may be the same material. The actuators may be lead-magnesium-niobate (PMN). The support structure may completely surround the actuators. The support structure may be approximately an order of magnitude stiffer than the actuators. The optical membrane may include a plurality of spaced pads on its bonding surface. The pusher pads in the first and second areas may be bonded to the actuators and support structure, respectively. They may be bonded to the actuators and the support structure with an epoxy material. The pads on the first area may be regularly spaced from each other. The stiffness of the intermediate area may be less than that between the actuators. The length of the intermediate area may be greater than that between the actuators. The thickness of the intermediate area may be less than that between the actuators. The inter-actuator stroke may be greater than ½ full dynamic range.

This invention also feature a method of fabricating a deformable mirror including providing a plurality of actuators and a support structure supporting and at least partially surrounding the actuators; applying an optical membrane across the actuators and at least a portion of the support structure. The optical membrane includes a first area, a second area and an intermediate area elastically decoupling the first and second areas. The first area is bonded to the actuators and the second area is bonded to the support structure. The optical membrane is polished.

In a preferred embodiment the invention may further include lapping the actuators before applying the optical membrane. The actuators may include ferroelectric material. The actuators include transverse $d_{31}$ actuators. The actuators may include piezoelectric material. The actuators may include an aspect ratio of greater than 4:1. The actuators and support structure may be the same material. The actuators may be lead-magnesium-niobate (PMN). The support structure may completely surround the actuators. The support structure may be approximately an order of magnitude stiffer than the actuators. The optical membrane may include a plurality of spaced pads on its bonding surface. The pads in the first and second areas are bonded to the actuators and support structure, respectively. The pads may be bonded to the actuators and the support structure with an epoxy material. The pads on the first area may be regularly spaced from each other. The stiffness of the intermediate area may be less than that between the actuators.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
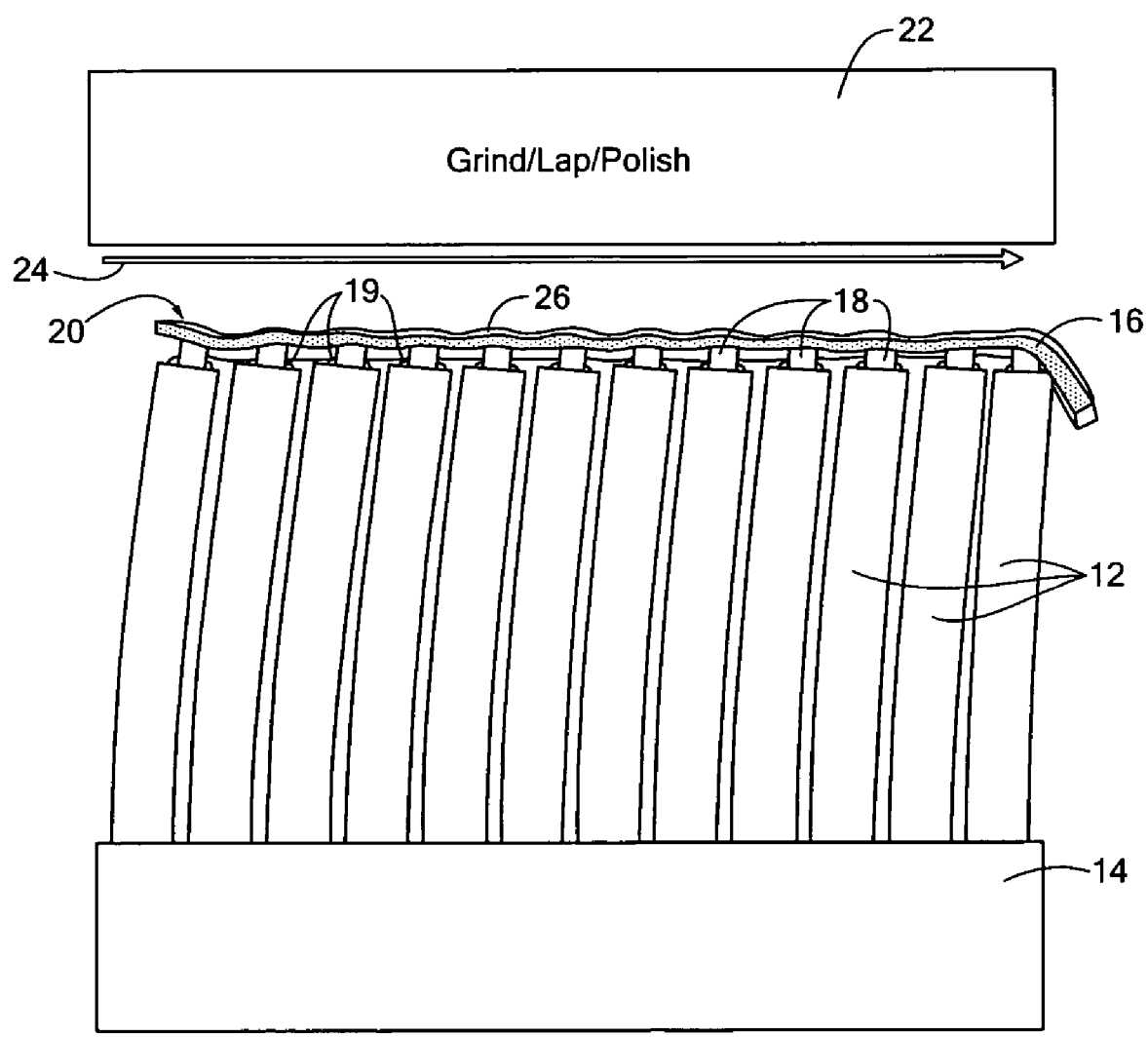
FIG. 1 is a schematic side sectional elevational view of a prior art deformable mirror suffering shear force distortion during lapping or polishing of the face plate or optical membrane.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1, a prior art deformable mirror 10 including a plurality of actuators 12 mounted on base 14 and carrying a face sheet or optical membrane 16 with pusher pads 18 bonded to the tops of actuators 12 by some bonding medium 19 such as epoxy. To obtain a desired mirror finish on mirror surface 20 that surface is ground, or lapped or polished by, for example, tool 22. During the polishing operation tool 22 creates sheer forces indicated at arrow 24 which cause actuators 12 to bend slightly. This produces an undesirable ripple effect 26 on surface 20. Also during polishing normal forces 30, FIG. 2, are developed which cause further ripple or distortion 32 in mirror surface 20.

Figure 2:
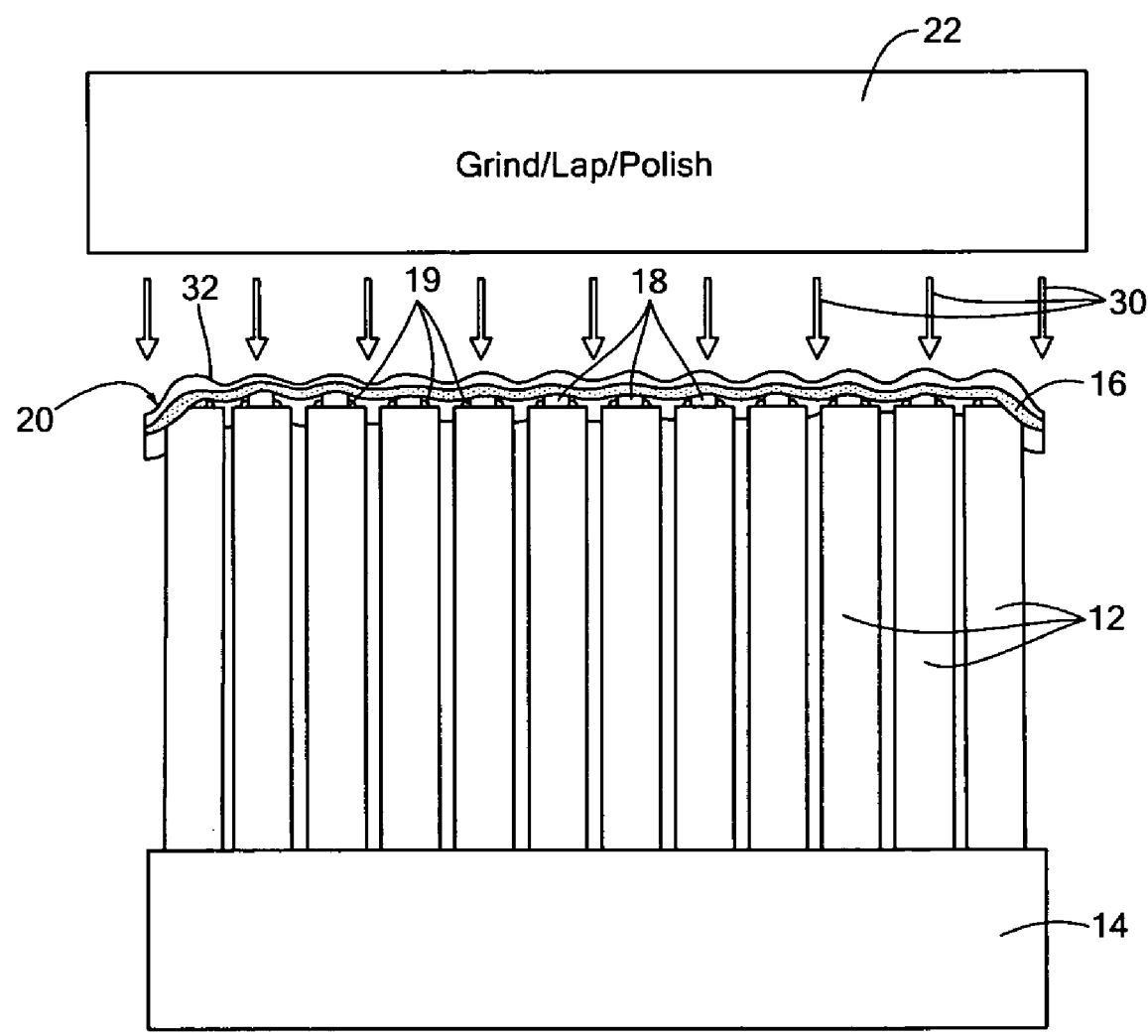
FIG. 2 is a view similar to FIG. 1 of a prior art deformable mirror suffering normal force distortion during lapping or polishing of the face plate or membrane.

Generally in order to keep the ripple distortion 32 in FIG. 2, and 26 in FIG. 1 within practical bounds actuators 12 are limited to an aspect ratio of no more that four to one, height to width, and this in turns limits the available stroke that they can deliver. If actuators 12 were made longer to create more stroke the ripple distortions 26 and 32 would be beyond what is practically tolerable. Making the actuators 12 shorter would reduce the ripple problem on surface 20 but would reduce the stroke of actuators 12. Membrane 16 also is constrained by polishing issues. The thicker membrane 16 is the higher the accuracy of the polishing that can be obtained, however, the thicker membrane 16 is made, the less flexible it will be and so the inter-actuator stroke, that is, how much one actuator can more with respect to another is limited to about ½ the dynamic range. If actuators 12 were to move relative to one another by more than that the risk is that the thicker membrane typically nine to ten mils would not be flexible enough to respond fully to the movement. Making the membrane thinner solves that problem but increases the problem of the ripple distortions 26 and 32.

Figure 3:
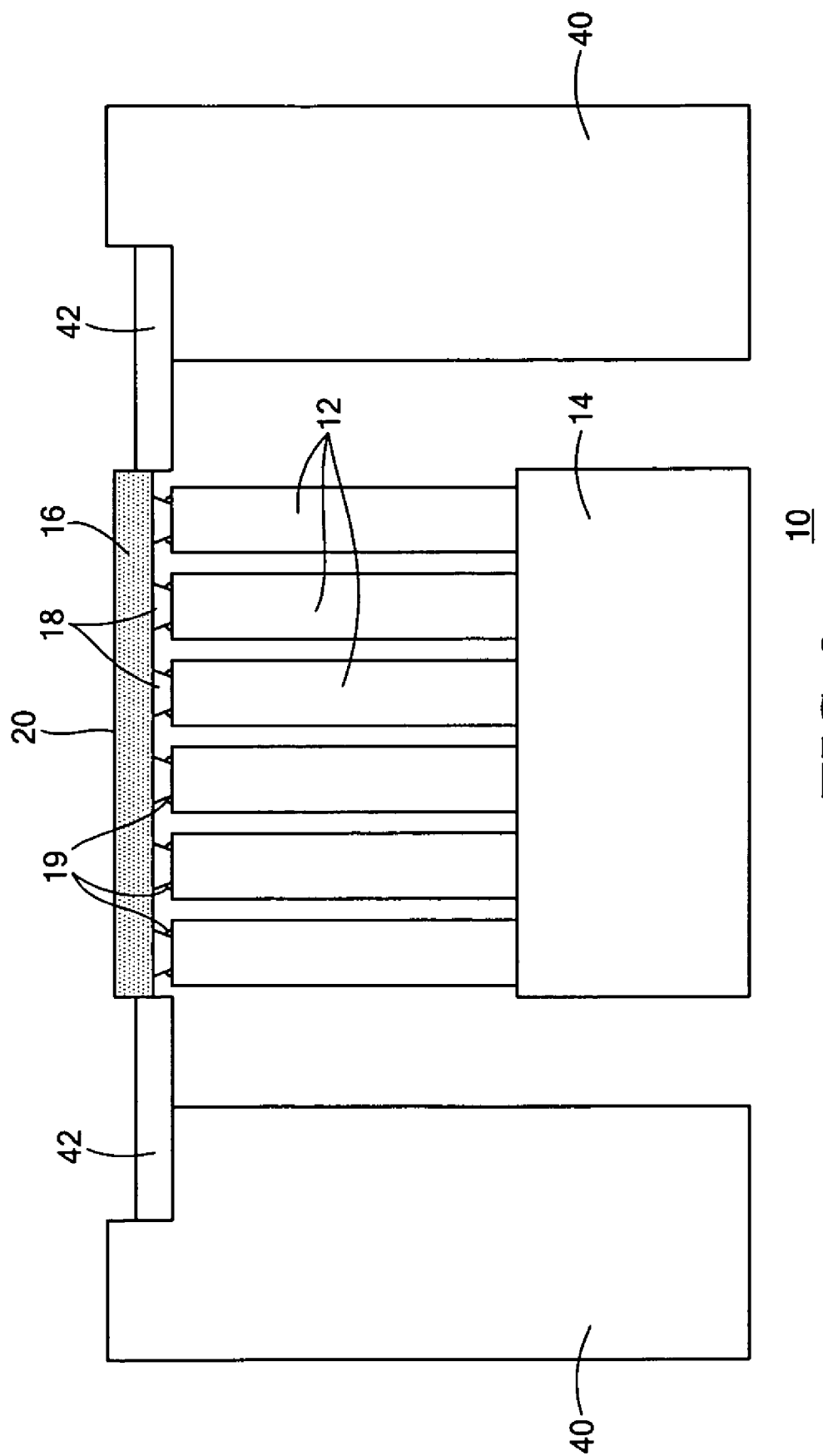
FIG. 3 is a view similar to FIG. 1 of a prior art deformable mirror using a shim seal and holding jig.
Figure 4:
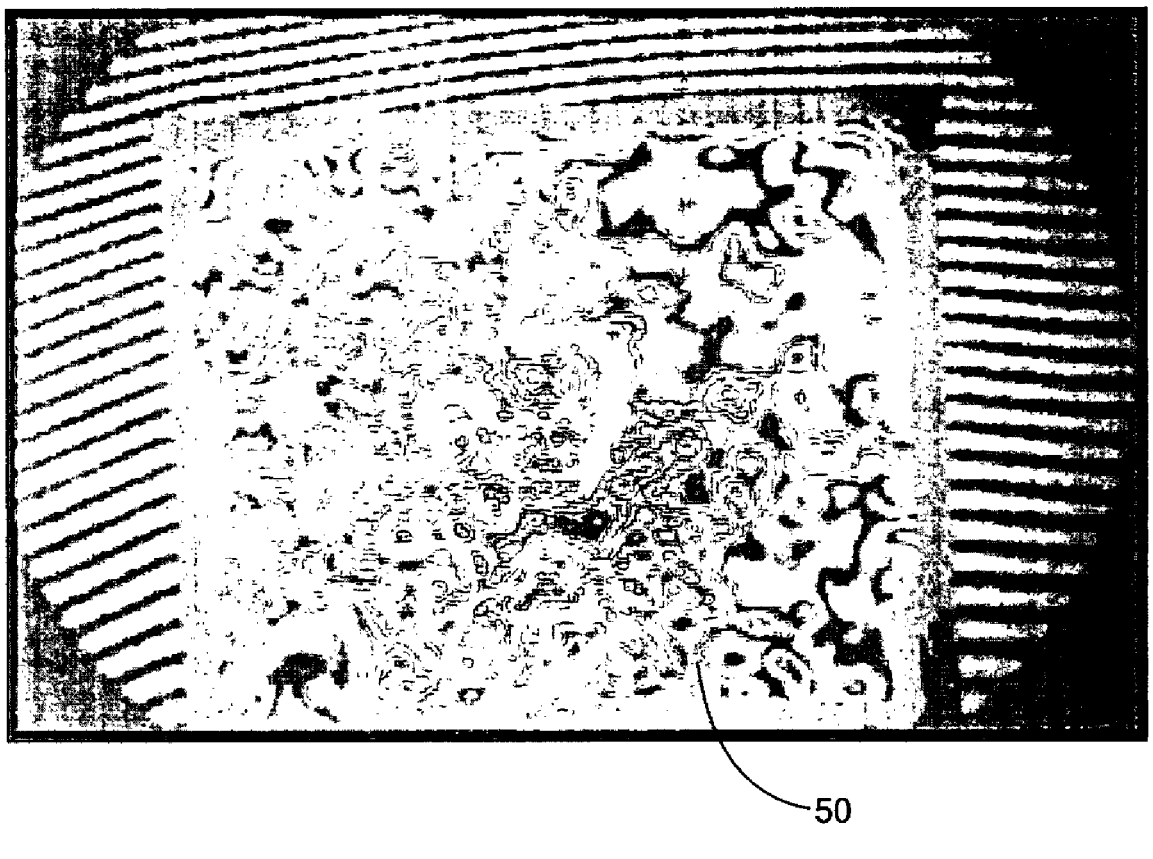
FIG. 4 is an illustration of an intensity map of a prior art optical membrane after lapping as shown in FIG. 3.

One approach to the problem is shown in FIG. 3, where deformable mirror 10 has been placed in a jig 40 with a removable shim or seal 42 that surrounds and contacts the face sheet or membrane 16. The shim or seal 42 is meant to accomplish two things: one is to seal the actuators 12, pads 18 and body material or epoxy 19 from the lapping liquid which can be for example any of a number of chemical compounds including water or water based, etching or non-etching, acid or alkaline. While this approach does add some stiffness to the membrane 16 to withstand, to some extent, the sheer and normal forces during lapping, it introduces a new problem. That is, when the lapping is done and the deformable mirror 10 is removed from the jig and the constraint applied by shim or seal 42 is released, the membrane 16 relaxes and the surface takes on new deformations. In addition the liquid seal between shim or seal 42 and membrane 16 is not complete so that some liquid can and does leak down to actuators 12, pads 18, and bonding medium 19. This can be seen from the intensity map 50, FIG. 4, made of a conventionally lapped membrane 16 twenty-four hours after it has been removed from the lapping machine. The ripples and distortion 26, 32 on mirror surface 20 are due mostly to liquid absorption and to normal and shear forces during lapping. The result is a finish having an RMS of only about 0.747 wavelength of Helium-Neon laser at 632 nm.

Figure 5:
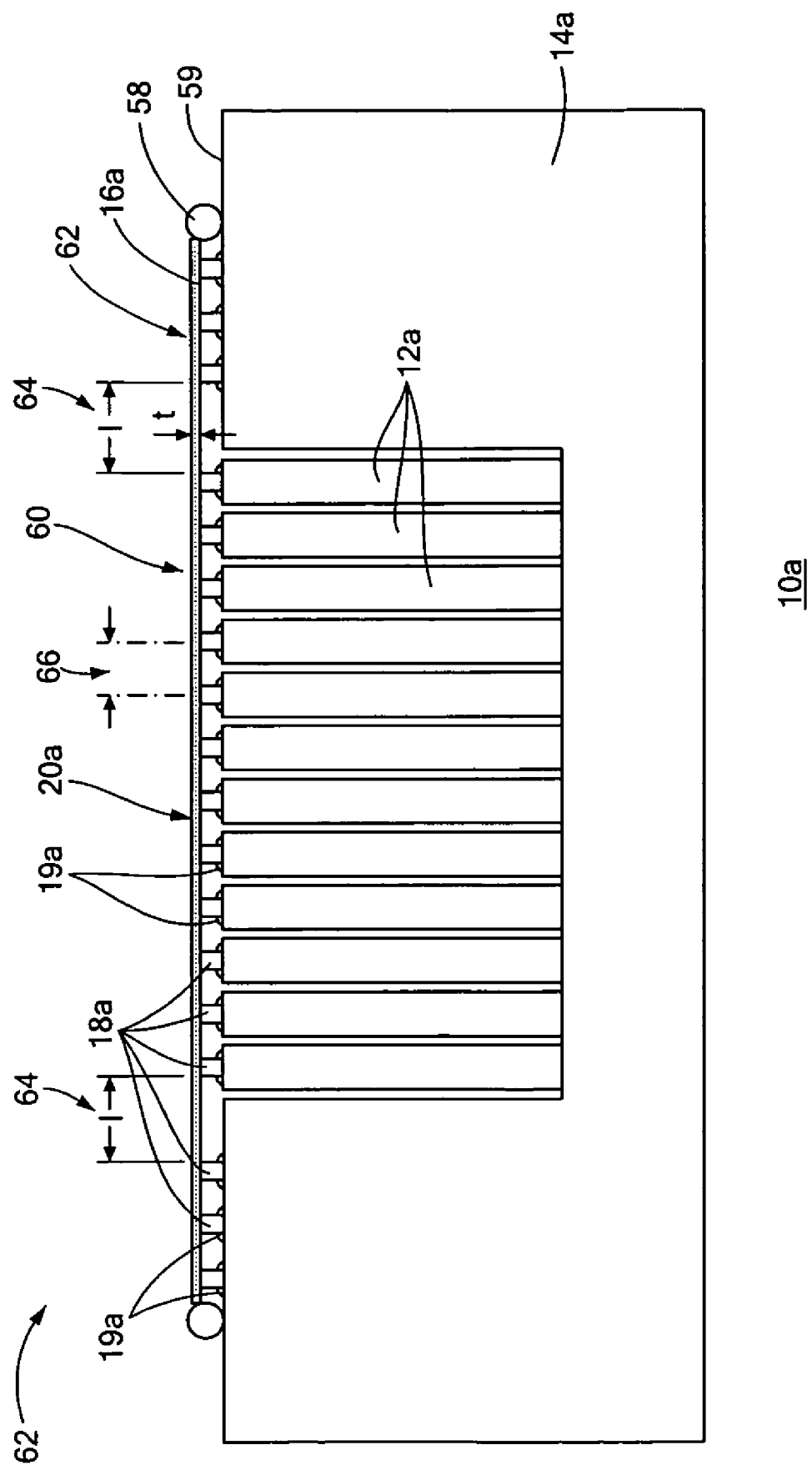
FIG. 5 is a schematic side sectional elevational view of a deformable mirror according to this invention.

In accordance with this invention actuators 12a, FIG. 5, are carried by and at least partially surrounded by support structure 14a. Face plate or membrane 16a, having push pads 18a, is connected to both actuators 12a and support structure 14a. There is a first area 60 which is attached by its push pads 18a and a bonding medium 19a to actuators 12a. There is a second area 62 surrounding it in FIG. 5 which is attached by push pads 18a and bonding medium 19a to support structure 14a. Connecting the two is an intermediate area 64 which is connected to neither support structure 14a nor actuators 12a and provides an elastic decoupling between the second area 62 of membrane 16a connected to support structure 14a and the first area 60 connected to actuators 12a. Sealing can be affected by an o-ring or bead or dam 58 sealing the edge of membrane 16a to the top 59 of support structure 14a. Deformable mirror 10a as a unit is subjected to the lapping operation but since the second area 62 is firmly bonded to support structure 14a which can be made much stiffer than actuators 12a, the lapping can be done to a much higher degree of accuracy and the distortion or rippling forces will be accommodated by the intermediate elastic portion 64, primarily and spare the first area 60 from rippling and distortion, where first area 60 is the primary mirror surface. Subsequently, when the lapping operation is over, there is virtually little or no degradation from relaxation since membrane 16a is not released but remains with support structure 14a as a completed deformable mirror 10a. There are multiple advantages to this invention: since the membrane 16a can be held stiffer it can be lapped to higher accuracies; it can withstand greater shear and normal polishing forces; and can be made thinner. Further, because membrane 16a can be held more rigidly by support structure 14a the actuators 12a can have an aspect ratio of greater than four to one and therefore can have a greater stroke. In addition, since membrane 16a can be made thinner by virtue of this newly provided stiffness the inter-actuator stroke can also be increased to greater than ½ the full dynamic range.

The choice of the proper stiffness k for area 64 depends upon e.g., the desired actuator spacing, stroke, inter-actuator stroke, ultimate mirror finish, accuracy, polishing loads. The plate bending constant D of intermediate area 64 is expressed in force×unit length i.e. in-lbs and is expressed as $$D = E\, t^3 / 12(1 - v^2) \tag{1}$$

where E is Young's Modulus t is the thickness of intermediate area 64 and v is Poisson's Ratio. The stiffness k is inversely proportional to the length $l^2$, and directly proportional to plate constant D so the longer the length l of intermediate area 64 the less stiff it will be i.e.

$$\text{stiffness } K \propto \frac{D}{l^2} \tag{2}$$

The stiffness is thus varied by varying the plate constant D and length l. By increasing the length in intermediate area 64 the stiffness of the coupling is decreased. Alternatively, the length l could be maintained while the thickness of the plate is reduced to decrease the stiffness.

The actuators may be made of any suitable material, for example, ferroelectric material, magnetostrictive, electrostrictive, piezoelectric material and they may be either normal actuators $d_{33}$ or transverse actuators $d_{31}$ as more fully explained in U.S. patent application Ser. No. 10/730,514 filed, Dec. 8, 2003, entitled TRANSVERSE ELECTRODISPLACIVE ACTUATOR ARRAY, by Mark A. Ealey (XIN-102) and U.S. patent application Ser. No. 10/936,229, filed Sep. 8, 2004, entitled ADAPTIVE MIRROR SYSTEM by Mark A. Ealey (XIN-104J) herein incorporated in their entirety by this reference. The actuators may be a piezoelectric material, now they may have an aspect ratio of greater than 4.1. In order to further reduce any relaxation degradation and thermal degradation the actuators and the support structure may be made of the same material, e.g., lead-magnesium-niobate (PMN). The support structure is typically approximately an order of magnitude stiffer than the actuators. That is, where the actuators have a bending stiffness of approximately 200 in-lb the support structure could have a stiffness of approximately 2,000 in-lbs. As a rule of thumb the stiffness of the intermediate area 64 should be less than that of the inter-actuator space.

Figure 6:
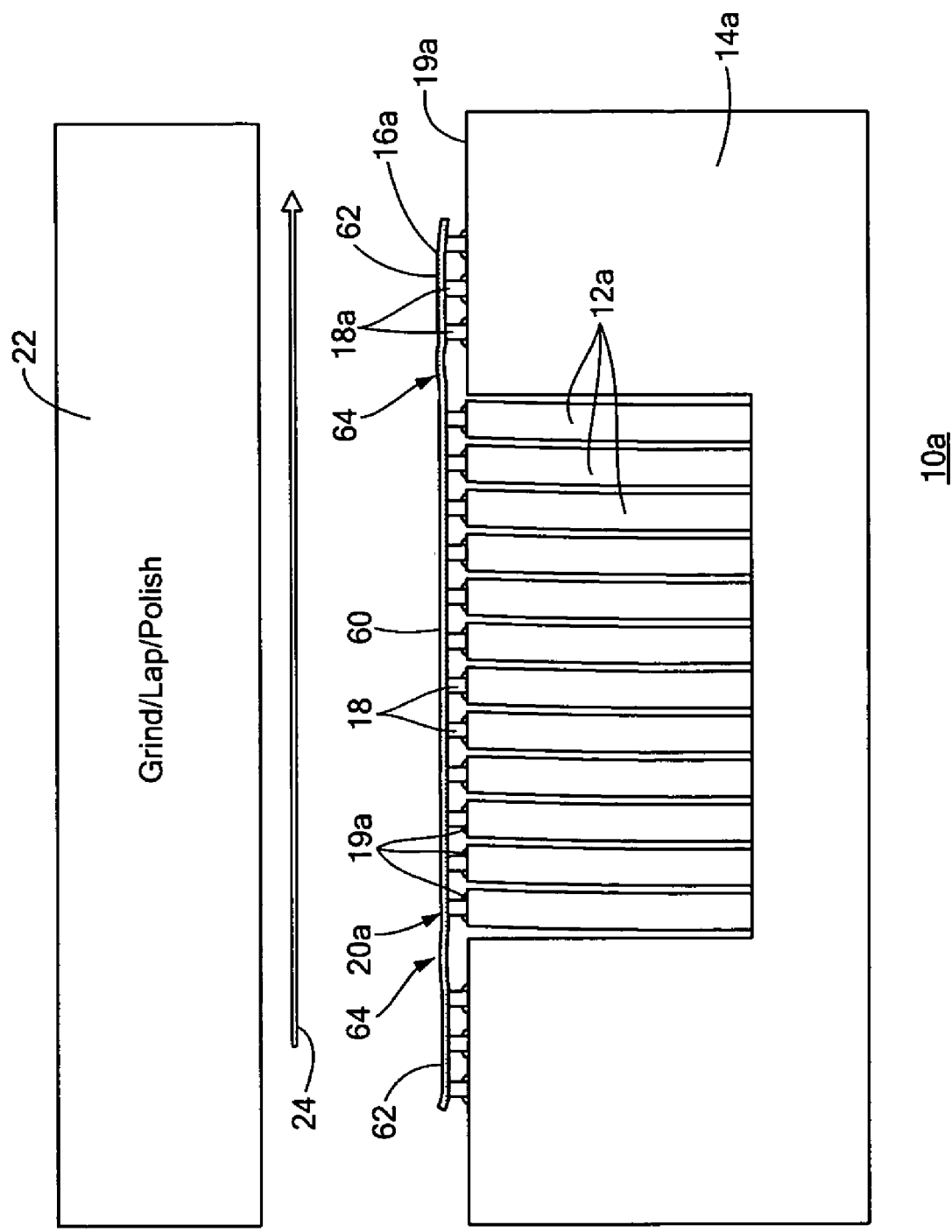
FIG. 6 is a schematic side sectional elevational view of the deformable mirror according to this invention undergoing lapping shear force.
Figure 7:
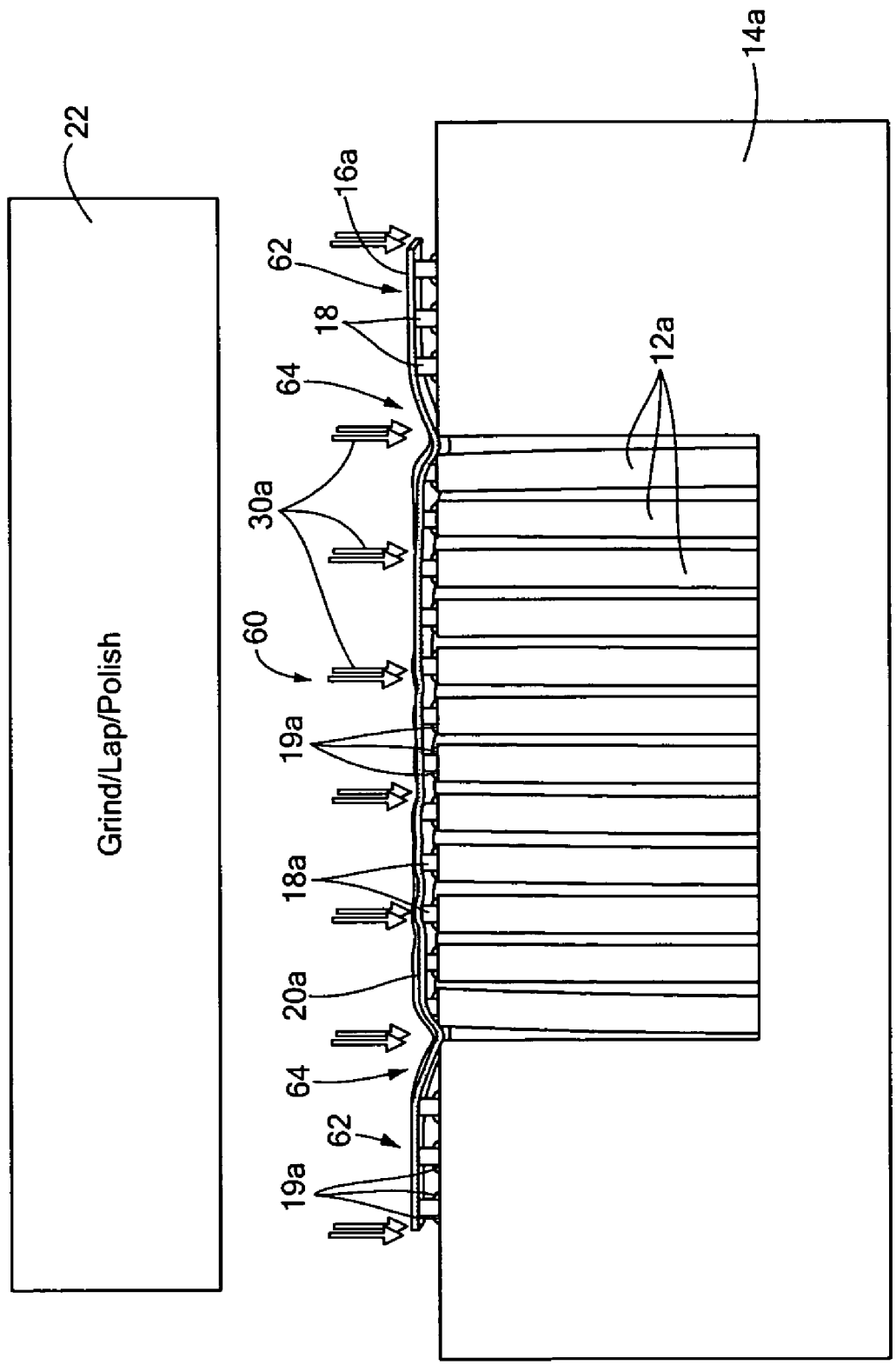
FIG. 7 is a schematic side sectional elevational view of the deformable mirror according to this invention undergoing lapping normal force.
Figure 8:
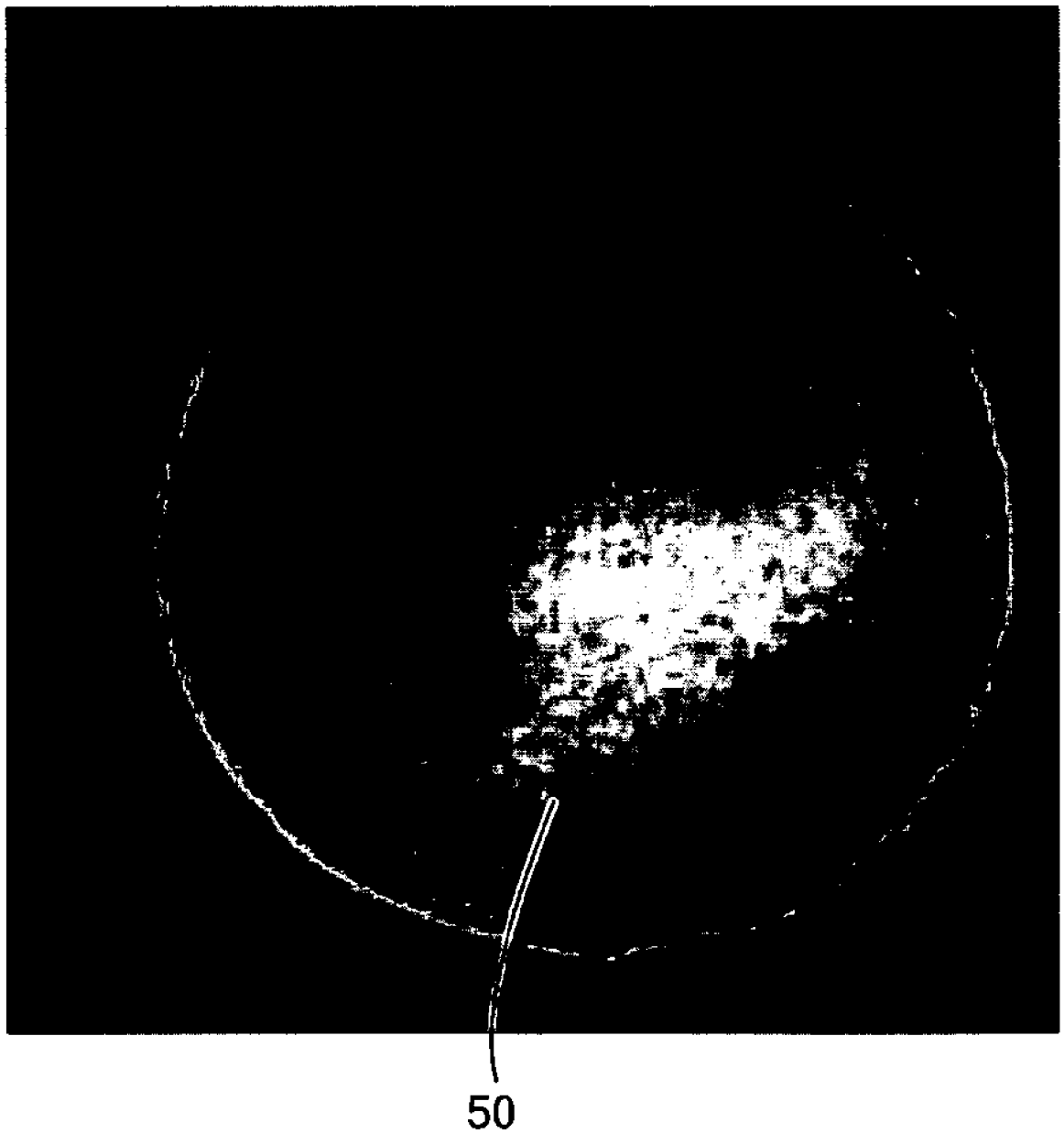
FIG. 8 is an illustration of an intensity map of an optical membrane after lapping in accordance with this invention.
Figure 9:
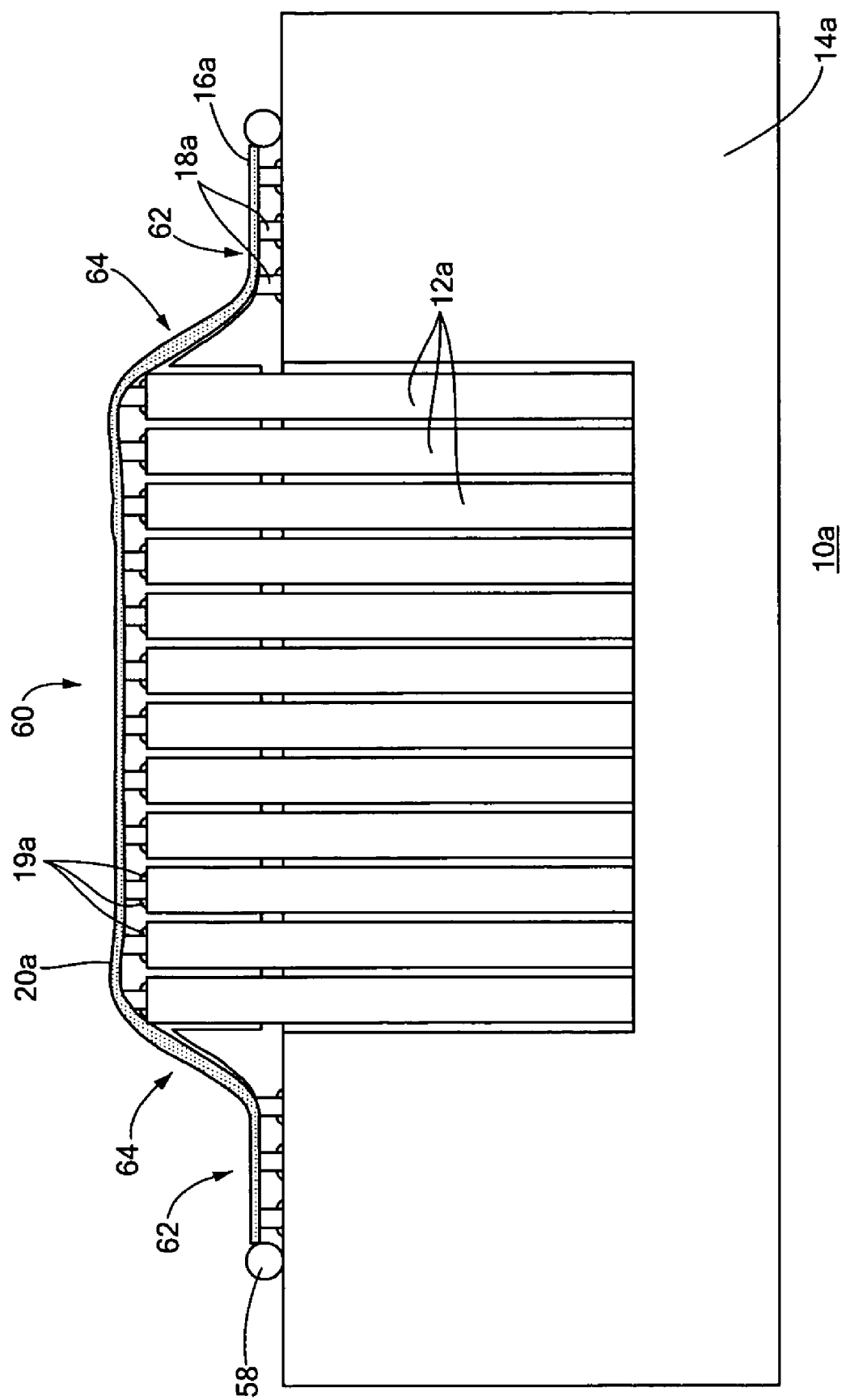
FIG. 9 is a view similar to FIG. 5 with the actuators at full stroke.

Now, the shear forces from lap tool 22, FIG. 6, cause only minimal effect on mirror surface 20a of membrane 16a and are absorbed more by the elastic intermediate area 64. A similar improvement occurs with respect to the normal forces as shown in FIG. 7, where it can be seen that again the intermediate elastic area 64 absorbs the effects of the normal force and relieves the area 60 from suffering the typical ripple distortion. Also note that in both FIGS. 6 and 7, in accordance with this invention there is little or no bending or flexing of the actuators 12a themselves since they are reinforced by the stiffness of support structure 14a. The actual results are shown dramatically in FIG. 8, where the intensity map 50 of the optical membrane is shown not just twenty-four hours later but thirty days later with a much smoother surface finish in a range of RMS 0.007 wavelength, an improvement of roughly two orders of magnitude. This presents the opportunity for another tradeoff in fabrication whereby the nine mil membrane could have a much higher finish or a much thinner membrane of 3 mils or so could have a wholly acceptable finish but a far greater flexibility allowing for greater inter-actuator stroke factors. Having been stiffened for lapping, deformable mirror 10a now assumes its operational role very well, as can be seen in FIG. 9, where all of the actuators 12a, have been extended an equal amount while the intermediate elastic area 64 which served to interconnect the first area 60, the primary mirror surface, with the second area 62, that is fixed to support structure 14a, now behaves elastically again to enable the various actuators to move up and down with minimum deformation of the first area 60, mirror surface 20a.

Figure 10:
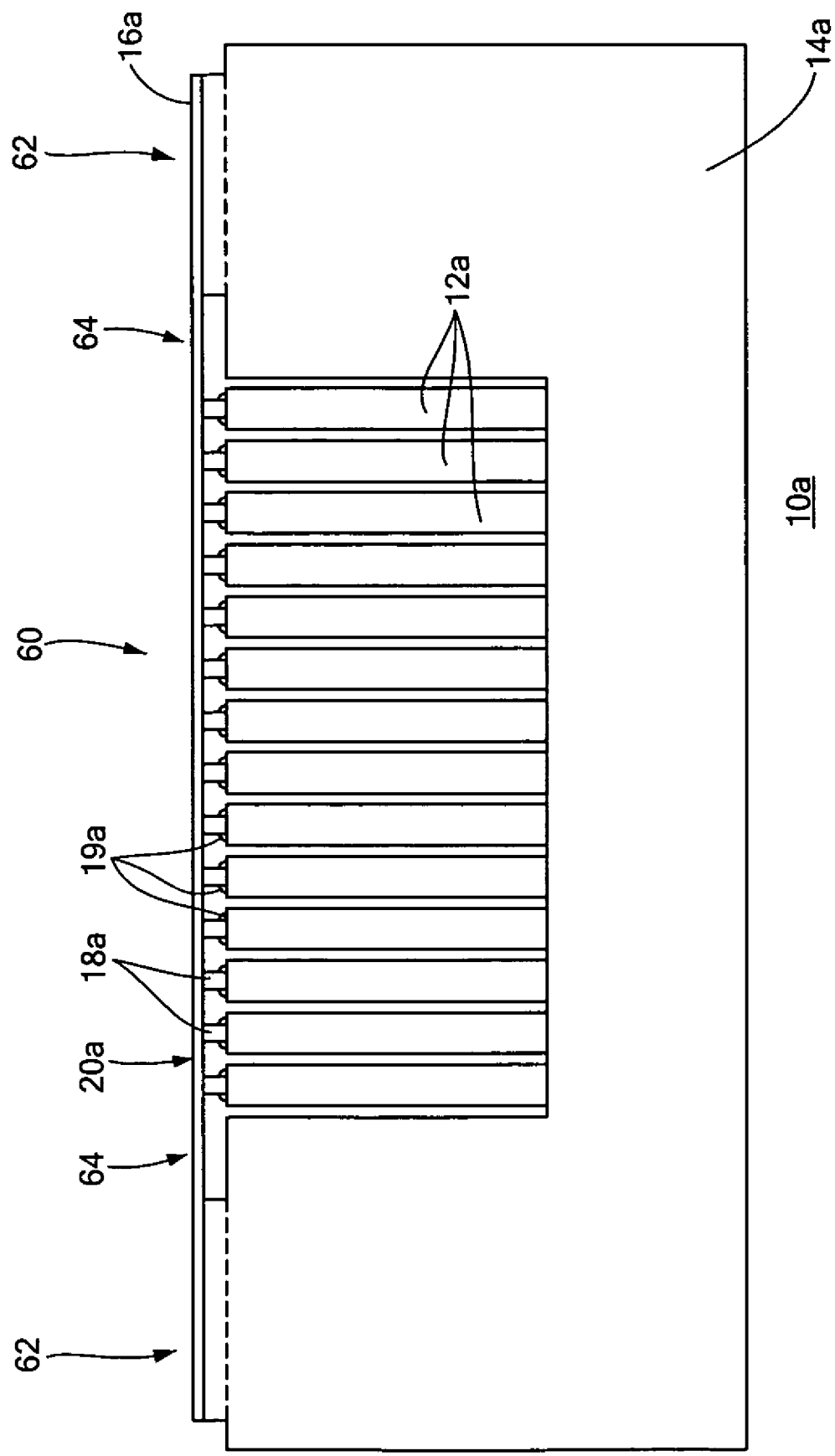
FIG. 10 is a view similar to FIG. 5 showing an alternative attachment of the membrane to the support structure.
Figure 11:
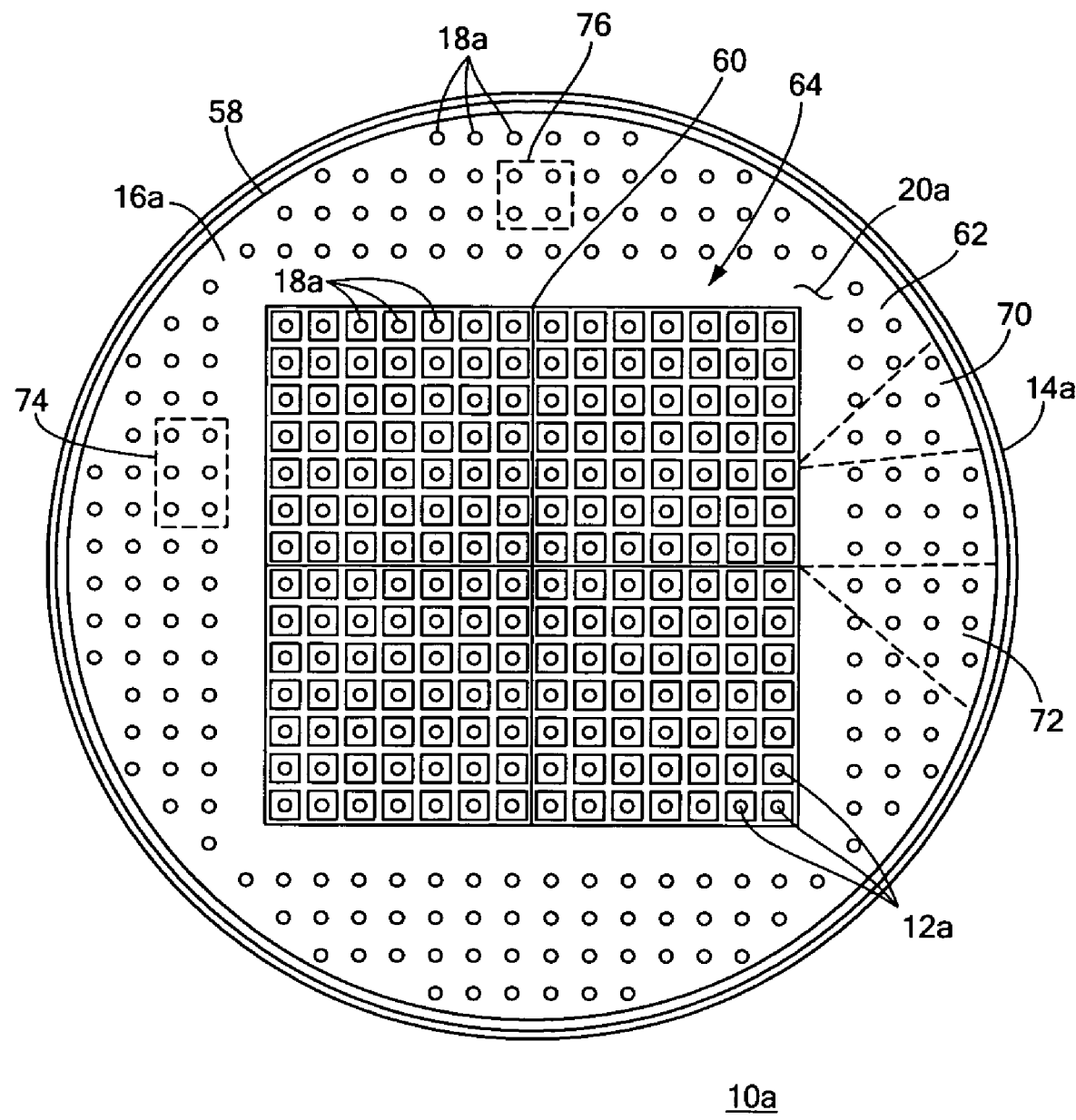
FIG. 11 is a schematic top plan view of the deformable mirror of FIG. 5.

Although thus far optical membrane 16a is conventionally provided with pads 18a, for bonding purposes, this is not a necessary limitation of the invention. For example, as shown in FIG. 10, either the membrane 16a or support structure 14a may have a shoulder so that the entire second area 62 of membrane 16a is bonded to support structure 14a. This eliminates the need for any further additional seal against lapping liquid leakage. Any suitable material can be used to bond as disclosed herein, for example, epoxy material or brazing, frit or solders. Pads 18a have been shown as spaced and regularly spaced at that, but this is not a necessary limitation of the invention, although it is typical and preferred. The stiffness of the intermediate elastic area, however obtained, by material manipulation, length, or thickness should be less than that between actuators. The construction of deformable mirror 10a can be seen in plan view in FIG. 11, where the support structure 14a completely surround the actuators 12a and seal 50a is a circumferential bead or o-ring. Actually support structure 14a need not entirely surround actuators 12a, whole sectors 70, 72, or small sections, 74, 76 may be absent while still practicing the invention.

Figure 12:
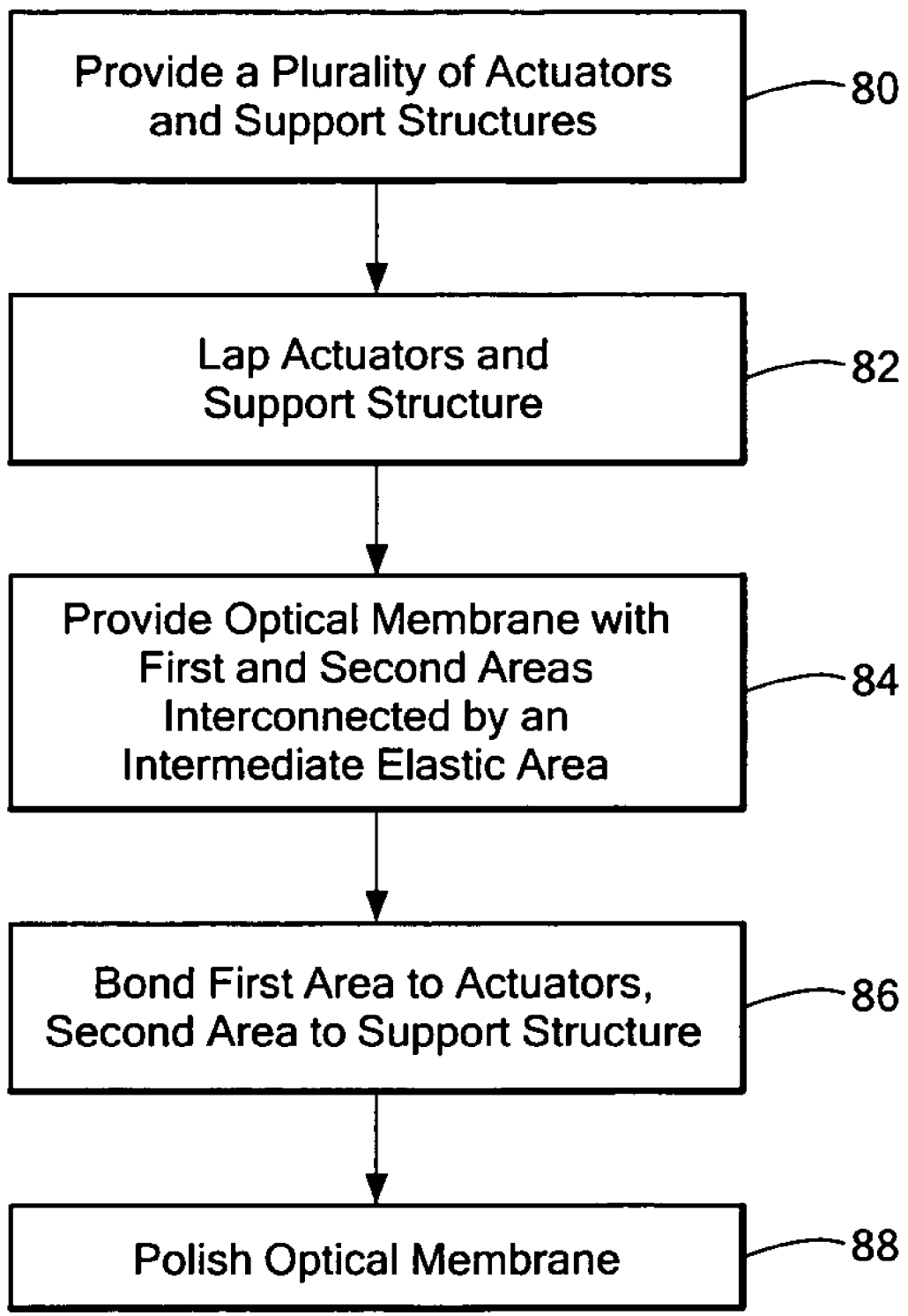
FIG. 12 is a block diagram of the method according to this invention of fabricating a deformable mirror with an edge constrained optical membrane.
Figure 13:
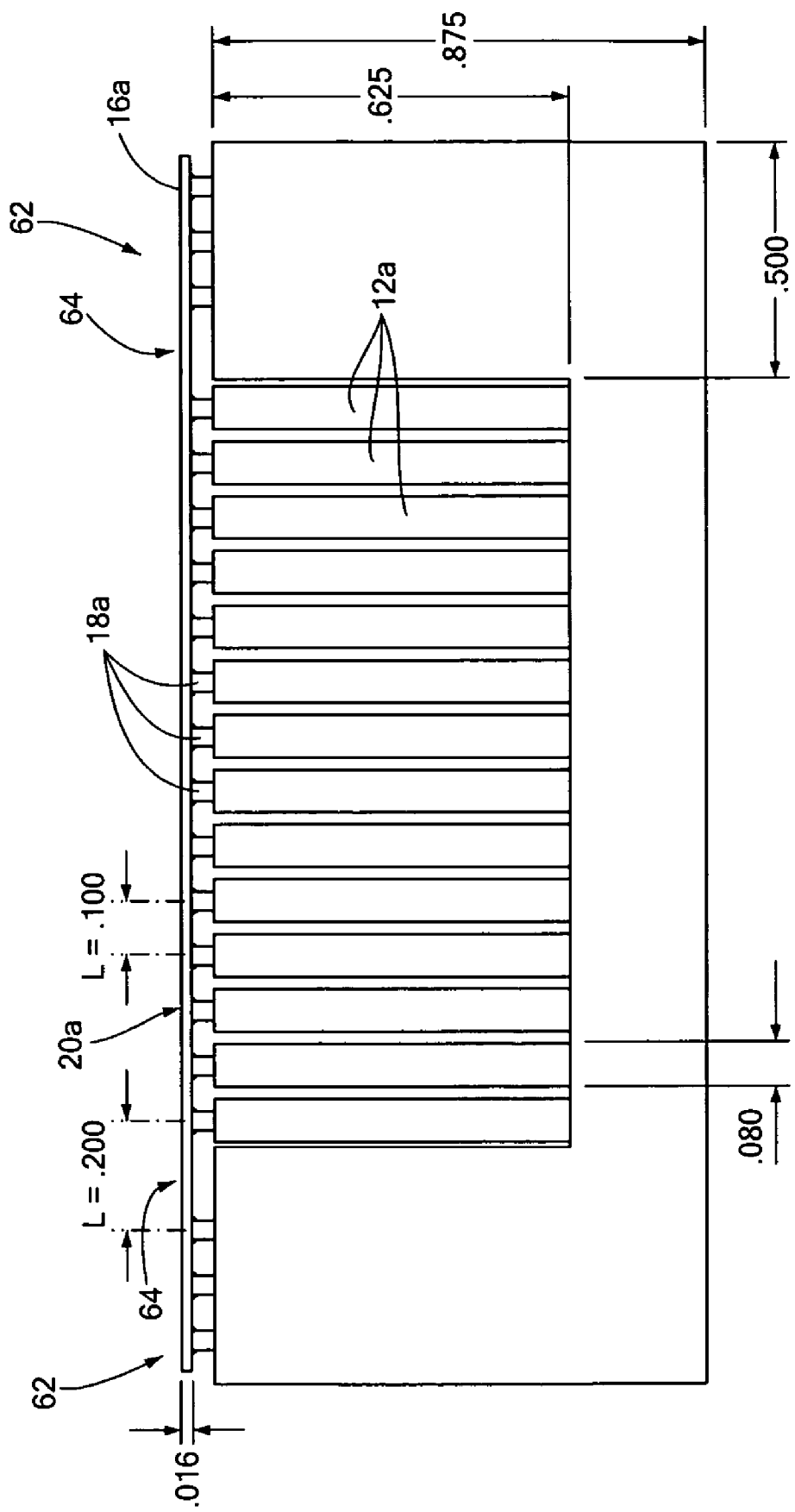
FIG. 13 is a detailed schematic diagram of one specific example of a deformable mirror according to this invention.

The invention also features a method of making an edge constrained optical membrane deformable mirror which includes providing a plurality of actuators with the support structure 80, FIG. 12. The support structure at least partially surrounds the actuators. The actuators and the support structure are lapped 82 to provide a flat surface. An optical membrane having first and second areas interconnected by an intermediate elastic area, 84 is also provided. The optical membrane is bonded in the first area to the actuators and in the second areas to the support structure 86 leaving the intermediate elastic area free to flex during the completed mirror operation yet provide a measure of improved rigidity during lapping or grinding. The optical membrane is then polished 88 to provide the desired mirror finish after which the deformable mirror including membrane, support structure and actuators performs and operates as a complete unit. One example of a deformable mirror built in accordance with this invention is shown in detail in FIG. 13, where the goal for this deformable mirror was to achieve an 30 nm surface figure with the full actuator motion across the deformable mirror to be 4 µm with a 2 µm limit between any adjacent actuator 12a. Actuators 12a are spaced at 0.100". To achieve the 4 µm actuation, an actuator length of 0.625 inches was used. The spacing of actuators 12a limited the diameter of the actuator to 0.080". The optical membrane 16a was designed to 0.016" thick fused silica glass, which has a stiffness of approximately 12000 lbs/in. The stress produced by deflecting the surface of membrane 16a by 2 µ/m is approximately 8000 psi. The decoupled elastic intermediate area was also designed to be 0.016" thick but spanned across a 0.200" area. The decoupled elastic intermediate area has a stiffness of 3000 lbs/in. Deflecting the decoupled area 64 of membrane 16a by 4 µm only produces a stress of 6000 psi. This allows a full range of motion across membrane 16a without producing higher stresses induced by constraining the edge. The bending stiffness of actuators 12a is approximately 200 in-lbs. The shear force produced during polishing reacting only against actuators 12a would produce unwanted deformations on the surface of membrane 16a. Support structure 14a was designed to accommodate most of the shear forces produced during polishing. Support structure 14a is 1.4" wide by 0.625" tall by 0.500 length. The bending stiffness of support structure 14a is four orders of magnitude greater than the actuators. This will virtually accommodate all the shear forces produced during polishing. The support structure 14a is made of lead-magnesium-niobate (PMN) as are actuators 12a.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. An edge constrained optical membrane deformable mirror comprising:
   a plurality of actuators;
   a support structure supporting and at least partially surrounding said actuators;
   an optical membrane extending across said actuators and at least a portion of said support structure, said optical membrane having a first area bonded to said actuators, a second area bonded to said support structure and an intermediate area elastically decoupling said first and second areas of said optical membrane, the stiffness of said intermediate area less than that of said first area.

2. The edge constrained optical membrane deformable mirror of claim 1 in which said actuators include ferroelectric material.

3. The edge constrained optical membrane deformable mirror of claim 2 in which said actuators include transverse $d_{31}$ actuators.

4. The edge constrained optical membrane deformable mirror of claim 2 in which said actuators include transverse $d_{33}$ actuators.

5. The edge constrained optical membrane deformable mirror of claim 1 in which said actuators include electrostrictive material.

6. The edge constrained optical membrane deformable mirror of claim 1 in which said actuators include magnetostrictive material.

7. The edge constrained optical membrane deformable mirror of claim 1 in which said actuators include piezoelectric material.

8. The edge constrained optical membrane deformable mirror of claim 1 in which said actuators include an aspect ratio of greater than 4:1.

9. The edge constrained optical membrane deformable mirror of claim 1 in which said actuators and support structure are the same material.

10. The edge constrained optical membrane deformable mirror of claim 1 in which said actuators are lead-magnesium-niobate (PMN).

11. The edge constrained optical membrane deformable mirror of claim 1 in which said support structure completely surrounds said actuators.

12. The edge constrained optical membrane deformable mirror of claim 1 in which said support structure is approximately an order of magnitude stiffer than said actuators.

13. The edge constrained optical membrane deformable mirror of claim 1 in which said optical membrane includes a plurality of spaced pads on its bonding surface.

14. The edge constrained optical membrane deformable mirror of claim 13 in which said pads in said first and second areas are bonded to said actuators and support structure, respectively.

15. The edge constrained optical membrane deformable mirror of claim 14 in which said pusher pads are bonded to said actuators and said support structure with an epoxy material.

16. The edge constrained optical membrane deformable mirror of claim 14 in which said pads on said first area are regularly spaced from each other.

17. The edge constrained optical membrane deformable mirror of claim 1 in which the length of said intermediate area is greater than that between said actuators.

18. The edge constrained optical membrane deformable mirror of claim 1 in which the thickness of said intermediate area is less than that between said actuators.

19. The edge constrained optical membrane deformable mirror of claim 1 in which the inter-actuator stroke is greater than ½ full dynamic range.

20. A method of fabricating a deformable mirror comprising:
    providing a plurality of actuators and a support structure supporting and at least partially surrounding said actuators;
    applying an optical membrane across said actuators and at least a portion of said support structure; said optical membrane including a first area, a second area and an intermediate area elastically decoupling said first and second areas of said optical membrane the stiffness of said intermediate area less than that of said first area;
    bonding said first area to said actuators and said second area to said support structure; and
    polishing said optical membrane.

21. The method of fabricating a deformable mirror of claim 20 further including lapping said actuators and support structure before applying said optical membrane.

22. The method of fabricating a deformable mirror of claim 20 in which said actuators include ferroelectric material.

23. The method of fabricating a deformable mirror of claim 22 in which said actuators include transverse $d_{31}$ actuators.

24. The method of fabricating a deformable mirror of claim 20 in which said actuators include piezoelectric material.

25. The method of fabricating a deformable mirror of claim 20 in which said actuators include an aspect ratio of greater than 4:1.

26. The method of fabricating a deformable mirror of claim 20 in which said actuators and support structure are the same material.

27. The method of fabricating a deformable mirror of claim 20 in which said actuators are lead-magnesium-niobate (PMN).

28. The method of fabricating a deformable mirror of claim 20 in which said support structure completely surrounds said actuators.

29. The method of fabricating a deformable mirror of claim 20 in which said support structure is approximately an order of magnitude stiffer than said actuators.

30. The method of fabricating a deformable mirror of claim 20 in which said optical membrane includes a plurality of spaced pads on its bonding surface.

31. The method of fabricating a deformable mirror of claim 30 in which said pads in said first and second areas are bonded to said actuators and support structure, respectively.

32. The method of fabricating a deformable mirror of claim 31 in which said pusher pads are bonded to said actuators and said support structure with an epoxy material.

33. The method of fabricating a deformable mirror of claim 31 in which said pads on said first area are regularly spaced from each other.

34. An edge constrained optical membrane deformable mirror comprising:
    a plurality of actuators;
    a support structure supporting and at least partially surrounding said actuators;
    an optical membrane extending across said actuators and at least a portion of said support structure, said optical membrane having a first area bonded to said actuators, a second area bonded to said support structure and an intermediate area elastically decoupling said first and second areas of said optical membrane, the thickness of said intermediate area less than that of said first area.

* * * * *